United States Patent [19]
Fukui et al.

[11] Patent Number: 5,806,567
[45] Date of Patent: Sep. 15, 1998

[54] HEAT INSULATED HOSE

[75] Inventors: Kouki Fukui; Hiroyuki Masui; Tomio Inada, all of Osaka, Japan

[73] Assignee: Totaku Industries, Inc., Osaka, Japan

[21] Appl. No.: 802,289

[22] Filed: Feb. 18, 1997

[30] Foreign Application Priority Data

Feb. 19, 1996 [JP] Japan .................................. 8-056802

[51] Int. Cl.⁶ .................................................. F16L 11/10
[52] U.S. Cl. ......................... 138/132; 138/149; 138/129; 138/137
[58] Field of Search .................................. 138/129, 149, 138/132–134, 140–144, 154, 137

[56] References Cited

U.S. PATENT DOCUMENTS

| | | | |
|---|---|---|---|
| 4,380,253 | 4/1983 | Mead et al. | 138/149 |
| 4,721,637 | 1/1988 | Suzuki et al. | 428/395 |
| 5,416,270 | 5/1995 | Kanao | 138/122 X |
| 5,555,915 | 9/1996 | Kanao | 138/133 |

FOREIGN PATENT DOCUMENTS 5-187594  7/1993  Japan .

Primary Examiner—Patrick F. Brinson
Attorney, Agent, or Firm—Whitham, Curtis & Whitham

[57] ABSTRACT

A heat insulated hose includes an approximately cylindrical inner layer having a helical cavity portion formed by unbonded overlapping of a part of a polyvinyl chloride band material, helical reinforcing wire of hard resin incorporated inside the cavity portion, a heat insulating layer made of a foam resin band which is helically wound around the cavity portion at the same pitch as the cavity portion, and an outer layer made from a soft polyvinyl chloride band covering an outer periphery of the heat insulating layer. The reinforced wire is a double layer wire including a core wire of polyolefin resin and a cover layer of soft polyvinyl chloride covering an outer periphery of the core wire, and the cover layer is made to adhere to an inner wall portion of the cavity portion with use of an adhesive agent or by thermal fusing.

15 Claims, 5 Drawing Sheets

HEAT INSULATED HOSE

BACKGROUND OF THE INVENTION

The present invention relates to a heat insulated hose suited to the transfer of air and the drainage of condensed water in heating and cooling equipment.

A conventional heat insulated hose of such type generally has a structure in which a reinforcing wire and a foam heat insulating material are helically wound onto an inner layer of the hose, and an outer layer is formed on the outer periphery of the foam heat insulating material. The reinforcing wire is formed of iron wire or hard synthetic resin wire. As shown in FIG. 7, for example, there is a proposal in which hard synthetic resin wire 62 is formed of polyolefin resin, a cavity portion 65 is formed in an inner layer 61, and the hard synthetic resin wire 62 is loosely installed in such a manner that the resin wire 62 is not bonded with the inner layer 61 in the inside of the cavity portion 65 (see Japanese Patent Unexamined Publication No. Hei. 5-187594).

FIG. 7 (FIG. 2 in the above-mentioned Publication) is provided as a drawing which shows the state of deformation in the case where the hose is bent. In FIG. 7, reference numeral 63 represents sponge heat insulating material, reference numeral 64 represents an outer wall of the hose, and symbol CL represents the center line of the hose.

In a hose using this type of reinforcing wire, it has long been known that instead of metal reinforcing wire such as iron or steel wire, which easily causes plastic deformation when the hose is inadvertently stepped on or large external pressure is applied to the hose and which has poor self-restoring ability, hard wire material of polyolefin resin may be used as the reinforcing wire. In the conventional hose in which the hard wire material 62 of polyolefin resin is loosely installed in an unbonded state in the inside of the cavity portion 65 formed on the tube wall, as shown in FIG. 7, when the hose is bent, a wall portion 66 on the inner face side surrounding the wire material 62 is projected toward the center line CL side of the hose on the inner face side of the bent portion, and the inner diameter of the hose is remarkably narrowed. Consequently, large resistance is imparted to the fluid in this bent portion to thereby impair a smooth flow of the fluid. For this reason, there is a problem that one must use a hose with an inner diameter larger than a necessary value.

SUMMARY OF THE INVENTION

Therefore, an object of the present invention is to provide a heat insulated hose with a structure which, while utilizing the advantages of this type of hard wire material of polyolefin resin, enables the smooth passage of fluid without any impairment of the flow, which maintains the inner circumferential face of the hose in a smooth continuous arc shape even when the hose is bent, without any narrowing of the inner diameter of the hose in the bent part, and which consequently permits use of the hose without changing the inner diameter from a predetermined value set in the linear piping even when the hose is bent.

A heat insulated hose of the present invention comprises an approximately cylindrical inner layer having a helical cavity portion formed by unbonded overlapping of a part of a polyvinyl chloride band material, helical reinforcing wire of hard resin incorporated inside the cavity portion, a heat insulating layer made of a foam resin band which is helically wound around the cavity portion at the same pitch as the cavity portion, and an outer layer made of a soft polyvinyl chloride band covering an outer periphery of the heat insulating layer, wherein the reinforcing wire is a double layer wire including a core wire of polyolefin resin and a cover layer of polyvinyl chloride covering an outer periphery of the core wire, the cover layer being made to adhere to an inner wall portion of the cavity portion with use of an adhesive agent or by heat fusing.

Having such a structure, the heat insulated hose according to the present invention uses such an action that impels the reinforcing wire of the hose toward the outer side of the small diameter part when the hose is bent. Through the bonded part between the reinforcing wire and the inner wall portion forming the cavity portion of the inner layer, the action which makes this inner wall portion project toward the center line side of the hose is blocked, so that this inner wall portion is lifted toward the outer side of the bent small diameter part, and the inner layer at this bent part maintains a smooth arc shape. This reinforcing wire does not use a design in which polyolefin resin wire is directly bonded as is, but rather uses the wire material of a double layer wire in which polyvinyl chloride (hereinafter referred to as PVC) resin covers the outer circumference of the core wire made of polyolefin resin. This configuration is adopted for reasons of adhesiveness, in that a secure adhesion can be easily obtained whether adhesion is conducted by an adhesive agent or by heat fusing with the inner layer forming band material made of the same soft PVC material, and because it enables sliding of the core wire within the cover layer at times of deformation due to treading or external pressure on the hose, and does not impair the self-restoring action.

At the time of carrying out the present invention, regarding the helical winding of the soft PVC band material which forms the inner layer, the reinforcing wire is fitted between the band materials, and the portions of required width of the band material are repeatedly wound to form the inner layer. As for the soft PVC band forming the outer layer, one side edge is bonded onto the inner layer, and the other side edge is bonded onto the previously wound band on the outer circumferential face of the foam resin band which forms the heat insulating layer, passing between these adjacent foam resin bands. Thus, it is possible to have a configuration in which the foam heat insulating band is wrapped around the inner layer, and it is also possible to integrally form the inner layer and the outer layer using a wide polyvinyl chloride band material which successively forms the band material forming the inner layer and the band material forming the outer layer. As the foam resin band, a foam band which has been foamed in closed cells is superior in heat insulating effects.

DETAILED DESCRIPTION OF THE INVENTION

Preferred embodiments of the present invention will be described below with reference to the drawings.

Figure 1:
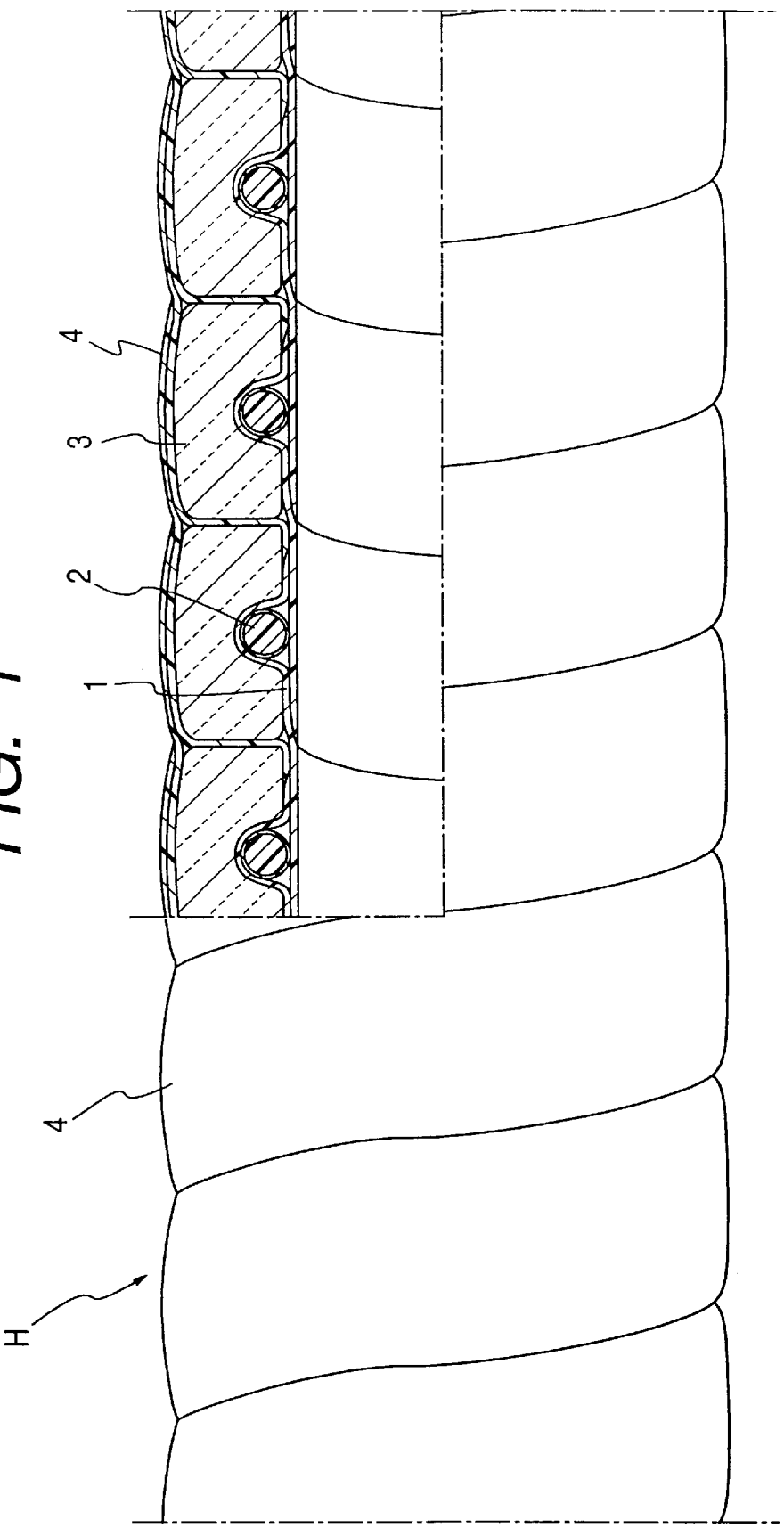
FIG. 1 is a partly vertical sectional front view showing the hose of a first embodiment.
Figure 2:
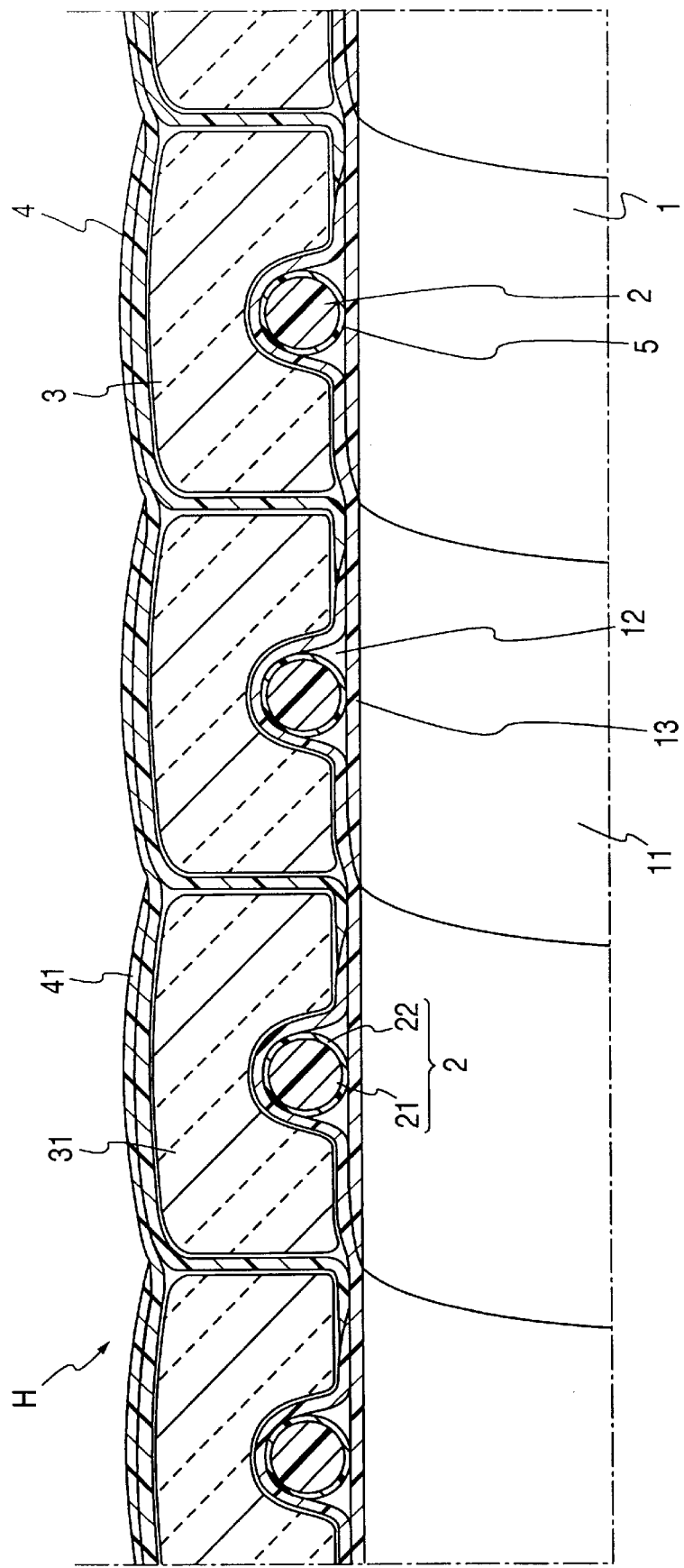
FIG. 2 is an enlarged sectional view of the wall portion of the hose of FIG. 1.
Figure 3:
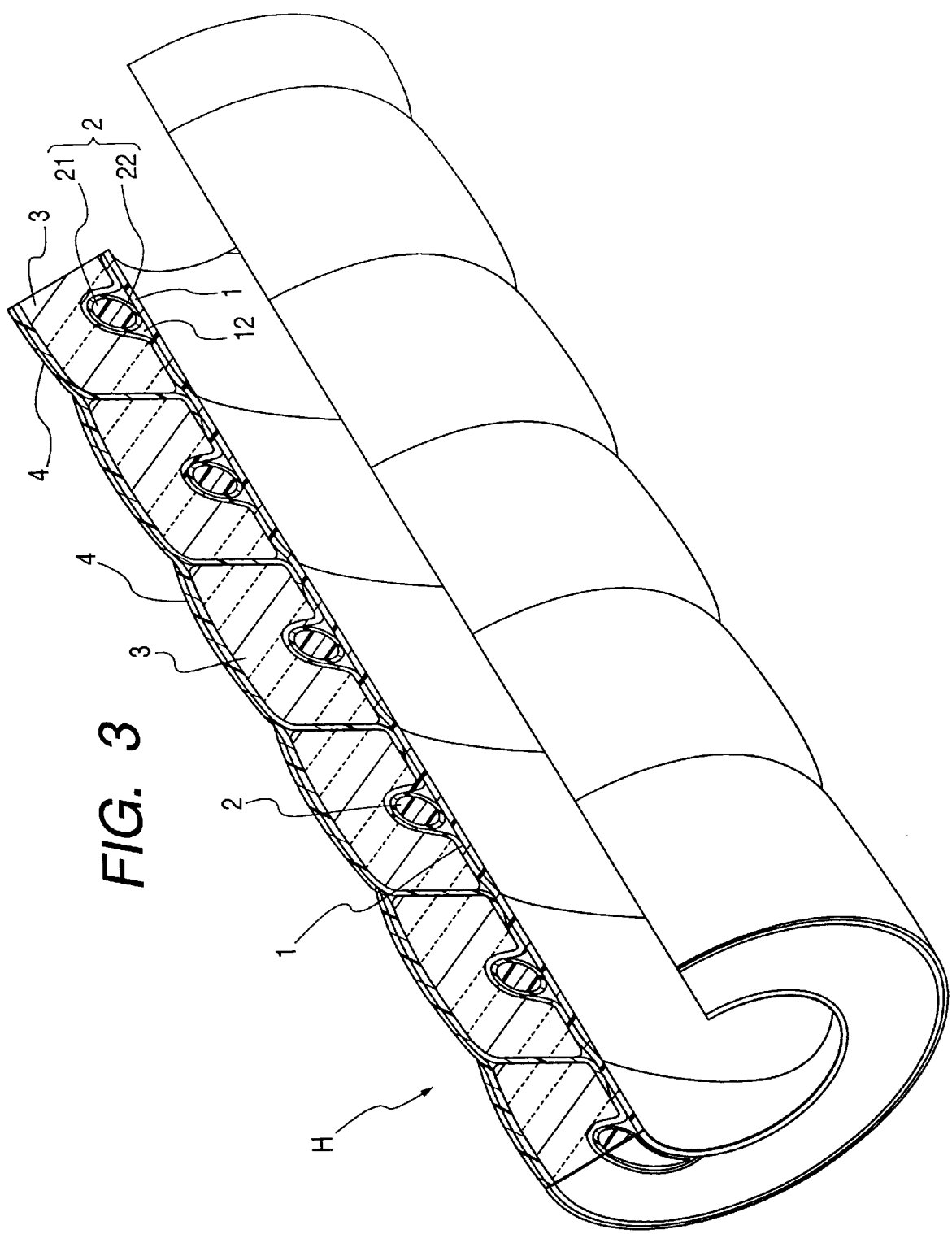
FIG. 3 is a partly vertical sectional perspective view of the hose of FIG. 1.
Figure 4:
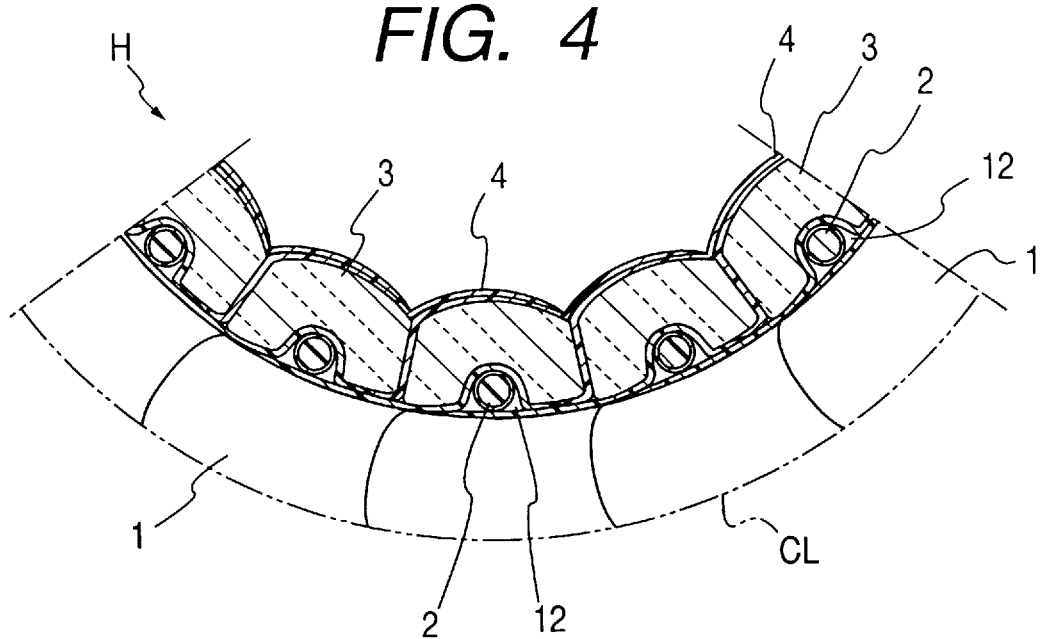
FIG. 4 is a sectional view showing the state of bending of the hose of FIG. 1.
Figure 7:
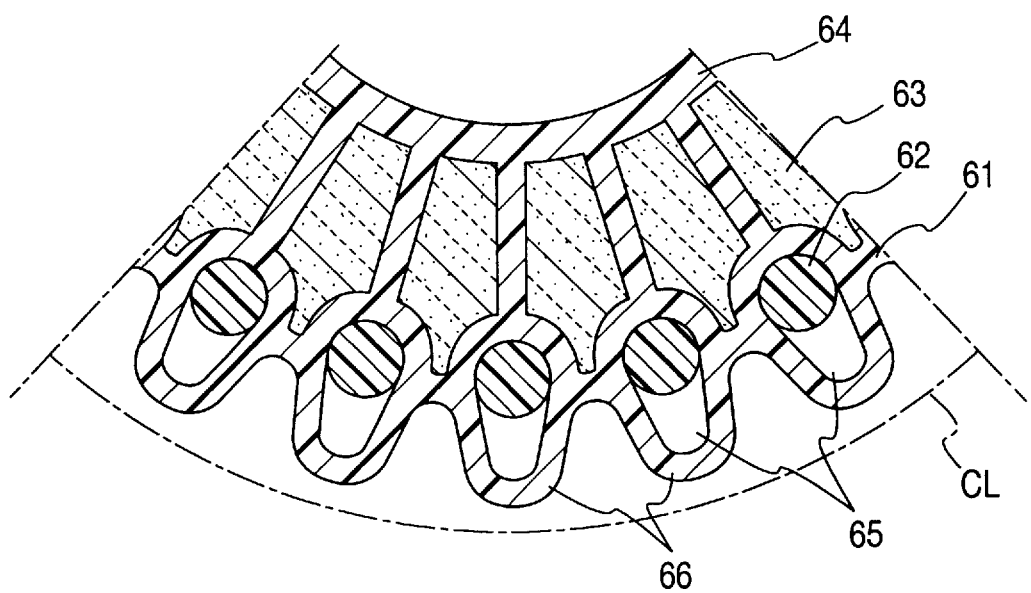
FIG. 7 is a sectional view equivalent to FIG. 4 showing a conventional hose.

FIGS. 1 to 4 are views showing a first embodiment of the present invention. FIG. 1 shows an external form and a sectional form shown by vertically cutting off a part of the hose. FIG. 2 is an enlarged view of the structure of a wall portion of the hose. FIG. 3 is a perspective view of the hose. FIG. 4 is a view showing the form of the wall portion in the bent part of the hose.

In the hose H shown in this embodiment, soft PVC material is used for a resin band material 11 forming an inner layer 1, a cover layer 22 of a reinforcing wire 2, and a resin band 41 forming an outer layer 4, respectively. Hard polypropylene (hereinafter referred to as PP) resin is used for the material of a core wire 21 of the reinforcing wire 2. Further, for example, polyethylene (PE) which has been foamed in closed cells to a density of about 33 kg/m$^3$ and tensile strength of about 1.7 kg/cm$^2$ is used for a foam resin band 31 forming a heat insulating layer 3.

As the first embodiment, a drainage hose H for air conditioning with, for example, an inner diameter of 13 mm and a helical pitch of 15 mm, will be described. A soft PVC band material 11 with a width of about 35 mm and a thickness of 0.3 to 0.6 mm is extruded onto a mandrel used to form a hose of 13 mm diameter from a synthetic resin extruder which is not illustrated. This band material is sequentially wound in a helical manner while approximately half the width of this band material is overlapped one on one to form the inner layer 1. At this time, an adhesive 5 is applied to the intermediate part of the half of the previously wound band material 11 with which the next wound band material overlaps (the left side half of the band material 11 shown in FIG. 2). Onto this, helically wound and bonded is a reinforcing wire 2 in which a soft PVC cover layer 22 with a thickness of 0.2 to 0.4 mm is formed on the outer circumference of a core wire 21 which is hard PP wire with a diameter of 1.5 to 2.5 mm. Approximately half the width of the next wound band material 11 is overlapped and fused with the previously wound band material 11 on the top of this reinforcing wire 2. On the top of the band material 11, a closed-cell foam resin band 31 with a width of approximately 15 mm and a thickness of approximately 8 mm is helically wound. Then, a soft PVC band 41 with a width of approximately 43 mm and a thickness of 0.3 to 0.6 mm which has been extruded from a separate resin extruder is formed so as to wrap the foam resin band 31 by fusing 3 to 5 mm of one-side edge onto the inner layer 1, and fusing the other-side edge part onto the previously wound band 41. In FIG. 2, reference numeral 12 designates a cavity portion formed between the overlapped parts of the inner layer forming band material 11. Reference numeral 13 is an inner wall portion forming the cavity portion.

The hose H formed in this way comprises the inner layer 1 having the cavity portion 12 formed by the PVC band material 11, the reinforcing wire 2 incorporated inside this cavity portion 12 and bonded onto the inner wall portion 13 by the adhesive 5, the heat insulating layer 3 of the foam resin band 31 which is helically wound onto the reinforcing wire 2, and the outer layer 4 of the PVC band 41 which is formed so as to wrap the heat insulating layer 3.

With regard to this heat insulated hose H, since the reinforcing wire 2 is bonded to the inner wall portion 13 of the inner layer 1 by the adhesive 5, as shown in FIG. 4, even when the hose H is bent, the inner wall portion 13 of the hose H in this bent part does not project toward the center line CL side of the hose H. Consequently, there is no narrowing of the inner diameter of the hose H at the bent part, and the inner circumferential face is maintained in a smooth continuous arc shape.

Figure 5:
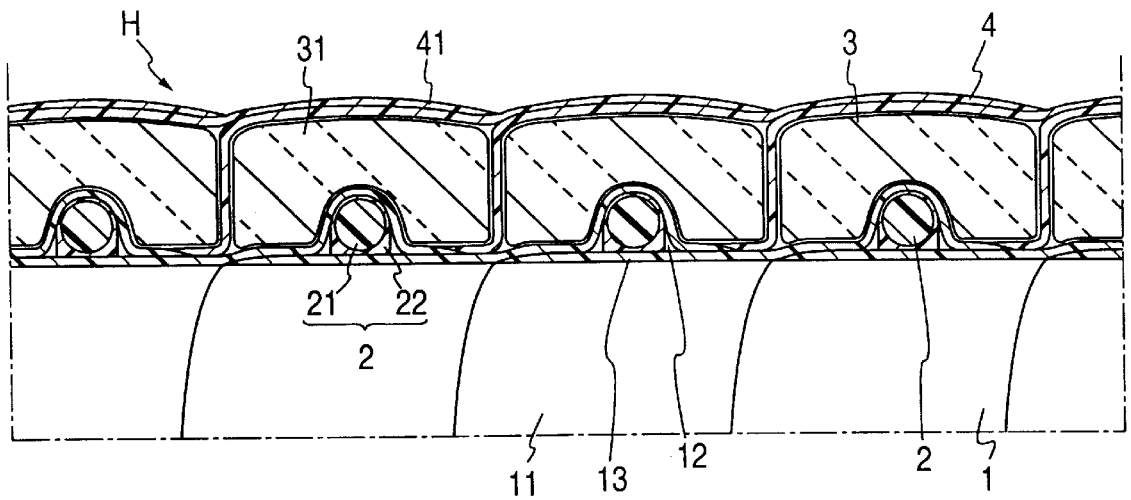
FIG. 5 is a sectional view equivalent to FIG. 2 showing a second embodiment.
Figure 6:
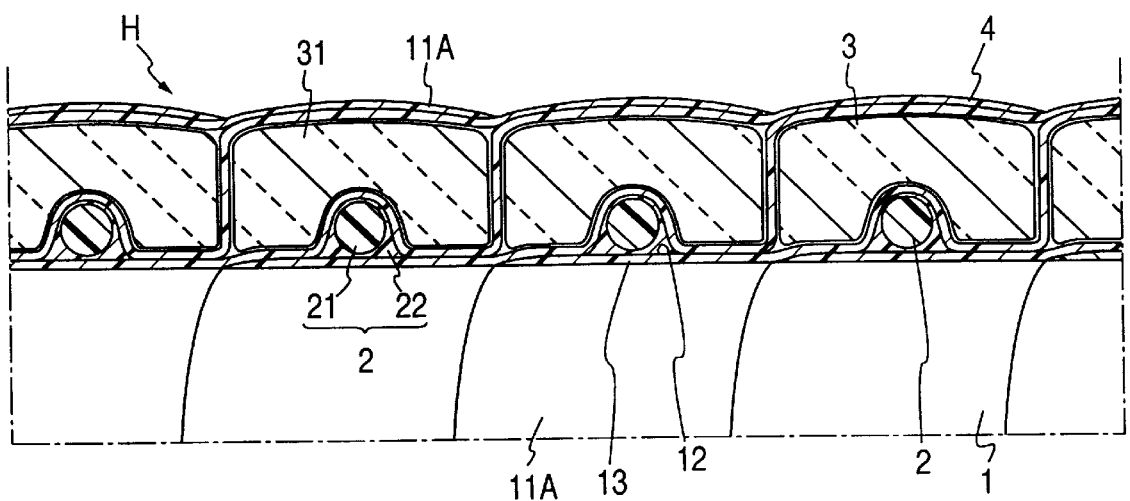
FIG. 6 is a sectional view equivalent to FIG. 2 showing a third embodiment.

FIGS. 5 and 6 respectively show different embodiments. With regard to the hose H shown in FIG. 5, the top half of the soft PVC cover layer 22 of the reinforcing wire 2 is formed in an arc, while the lower half is given a square shape. With regard to the hose H shown in FIG. 6, the top half of the cover layer 22 of the reinforcing wire 2 is formed in an arc, while the lower half is given a trapezoidal shape. Moreover, the hose H in the embodiment of FIG. 6 is configured so that the band material forming the inner layer 1 and the band material forming the outer layer 4 are made from a continuous and widely formed PVC band material 11A, and the inner layer 1 and outer layer 4 are integrally formed using this wide band material 11A. The other points are the same as the preceding embodiment 1.

Although the embodiments, which appear to be representative, has been described, the present invention is not necessarily limited to the structures of these embodiments. For example, it is possible to modify the structure so that the reinforcing wire 2 is extruded from a resin extruder and fused to the inner wall portion 13 of the inner layer 1; contrarily an existing band which is formed in advance into the inner layer forming band material 11, the outer layer forming band 41, or the wide band material 11A is used and the overlapped parts are bonded by an adhesive agent; or the reinforcing wire 2 is made to adhere not only to the inner wall portion 13 of the cavity portion 12 of the inner layer 1 but also to the upper wall portion. It is possible to make appropriate modifications to the embodiments so long as the necessary elements of the configuration of the present invention are provided, the object of the present invention is met, and the below-mentioned effects are obtained.

As is clear from the above description,-with regard to the heat insulated hose of the present invention, since hard wire material of polyolefin resin is used as the reinforcing wire constituting the hose, there is an advantage that even if the hose is inadvertently stepped on or an unexpectedly large external pressure is imparted, the hose does not easily cause plastic deformation, but it is self-restoring. Further, since the polyolefin resin material which has poor adhesiveness with PVC is covered by PVC resin to form a double layer wire, and since adhesion to the inner wall portion of the inner layer is conducted using this PVC cover layer, adhesion can be easily and securely accomplished. Morever, even when the hose is used in bent piping, the inner circumferential surface of the hose at the bent part can be maintained in a smooth and continuous arc, and since any narrowing of the inner diameter of the hose can be avoided, there can be smooth passage without any blockage of the flow of the fluid. Consequently, it is possible to expect the remarkable effect that even with bent piping, it is possible to use a hose of the same predetermined inner diameter as in the case of linear piping.

Furthermore, with regard to the manufacture of the heat insulated hose of the present invention, there is an advantage that there is no need for any special equipment, and that efficient and continuous production can be easily conducted using the conventional manufacturing equipment for heat insulated hoses as is.

What is claimed is:
1. An insulated hose, comprising:
an approximately cylindrical inner layer comprising a first polyvinyl chloride band material having a helical cavity portion defined by an unbonded overlapping portion of said polyvinyl chloride band material, said helical cavity portion having an inner wall;
a helical reinforcing wire comprising a hard resin material positioned in said cavity portion;

a heat insulating layer comprising a foam resin band helically wound around said cavity portion at a same pitch as that of said cavity portion; and an outer layer comprising a second polyvinyl chloride band material covering an outer periphery of said heat insulating layer, wherein said reinforcing wire comprises a double-layer wire including a core wire of polyolefin resin and a cover layer of polyvinyl chloride covering said core wire, said cover layer being adhered to said inner wall of said helical cavity portion with an adhesive agent or by heat fusing.

2. An insulated hose according to claim 1, wherein one side edge of said first polyvinyl chloride band material is bonded to said second polyvinyl chloride band material, such that said foam resin band is positioned between overlapping adjacent regions of said first polyvinyl chloride band material and said second polyvinyl band material.

3. A heat insulated hose according to claim 1, wherein said foam resin band comprises a closed cell material.

4. A heat insulated hose according to claim 2, wherein said foam resin band comprises a closed cell material.

5. A heat insulated hose according to claim 1, wherein said core wire is movable within said cover layer.

6. A heat insulated hose according to claim 1, wherein an inner diameter of said hose remains constant when said hose is bent.

7. A hose comprising:

a helically wound flexible band having successive windings, said windings including an inner layer, an intermediate layer and an outer layer;

a heat insulating layer positioned between said outer layer and said intermediate layer;

a double-layer wire positioned between said intermediate layer and said inner layer, said double-layer wire including an inner wire comprising a first plastic material and an outer covering comprising a second plastic material, said outer covering being bonded to said inner layer.

8. A hose as in claim 7, wherein said inner wire is movable within said outer covering.

9. A hose as in claim 7, wherein an inner diameter of said hose remains constant when said hose is bent.

10. A hose as in claim 7, wherein said flexible band comprises polyvinyl chloride.

11. A hose as in claim 7, wherein said flexible band comprises a single, continuous band.

12. A hose as in claim 7, wherein said heat insulating layer comprises a foam resin.

13. A hose as in claim 12, wherein said foam resin comprises a closed cell material, said inner wire first plastic comprises polyolefin resin and said outer covering second plastic comprises polyvinyl chloride.

14. A hose as in claim 7, wherein said outer covering and said inner layer have a thermal bond therebetween.

15. A hose as in claim 7, further comprising an adhesive for bonding said outer covering to said inner layer.

* * * * *